UNITED STATES PATENT OFFICE.

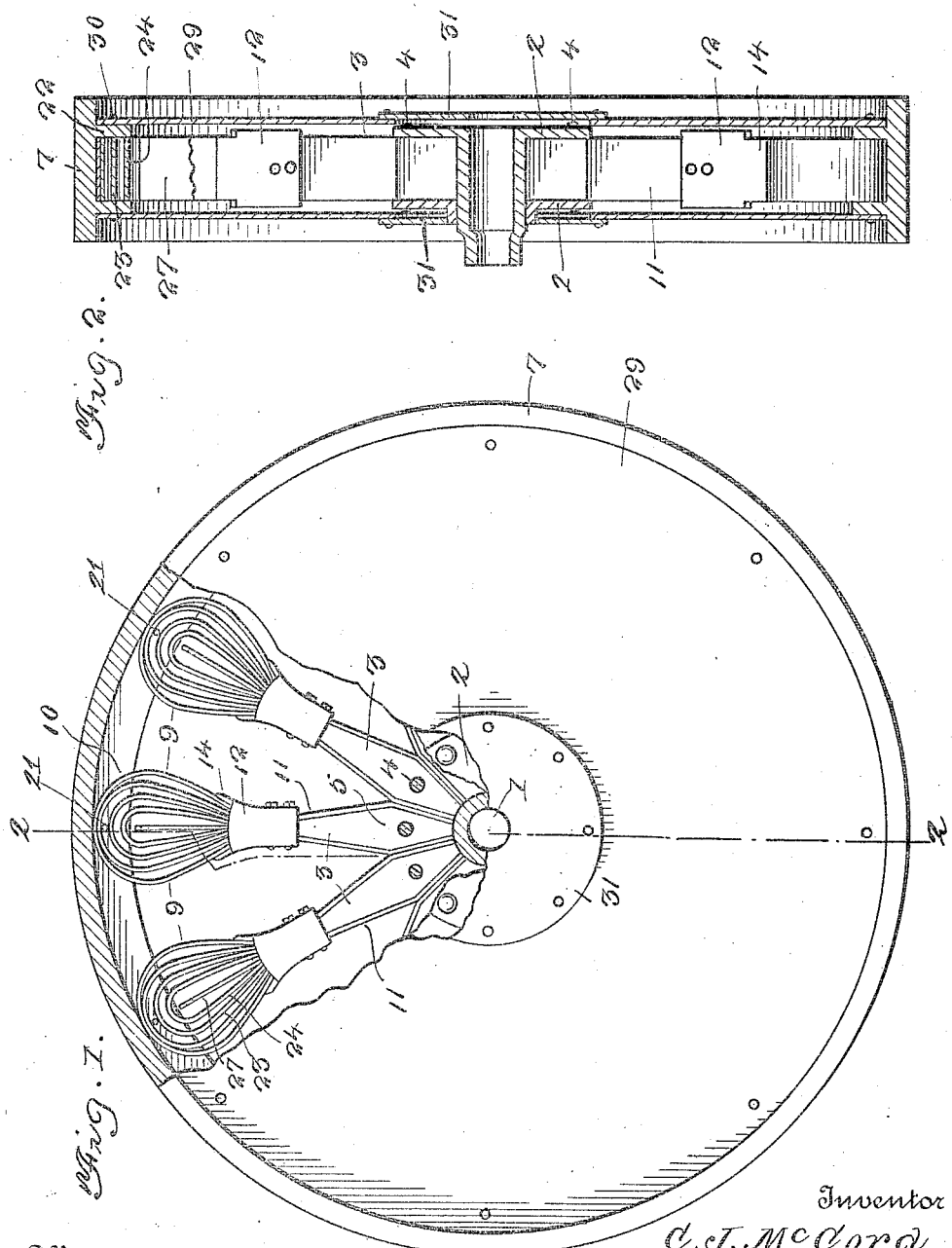

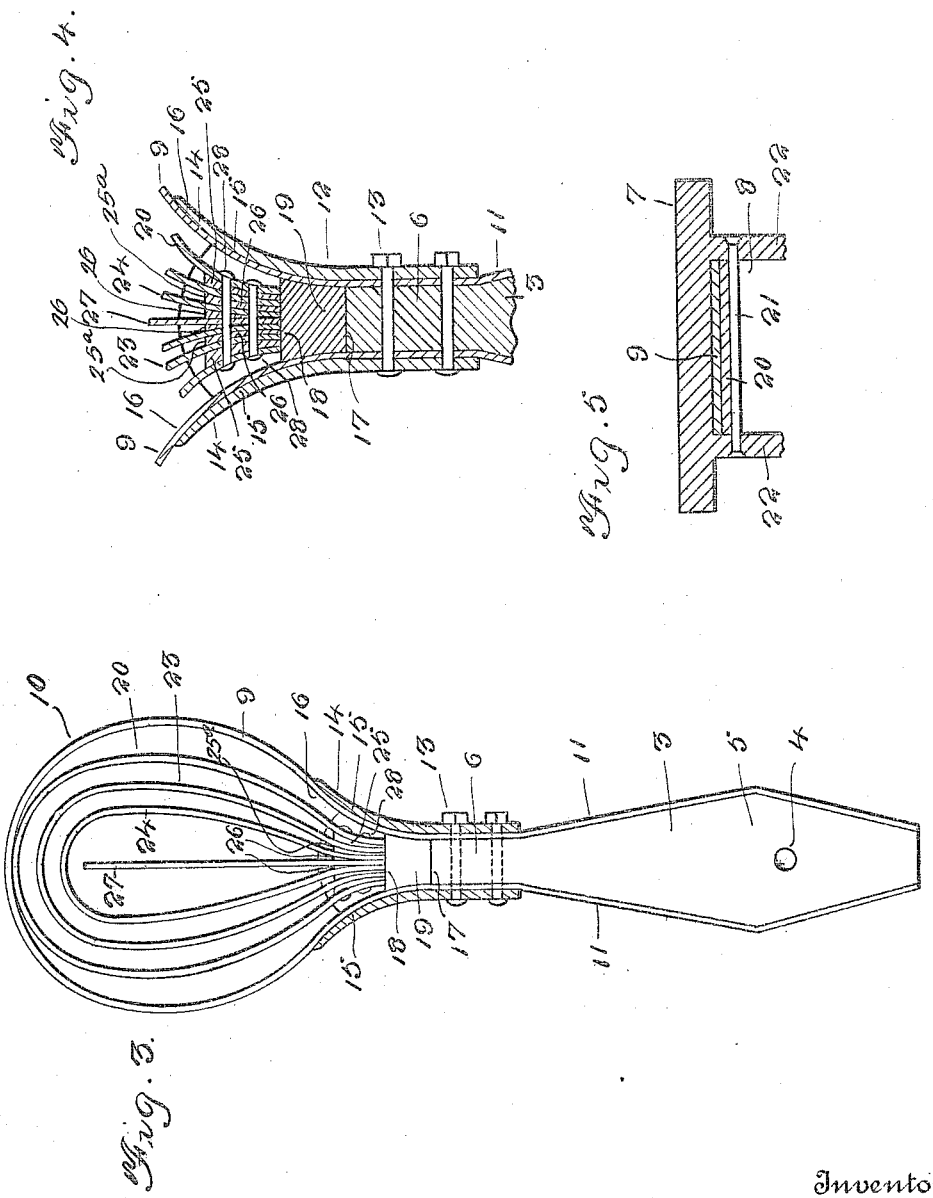

CHARLES J. McCORD, OF MERRILL, WISCONSIN.

SPRING-WHEEL.

1,305,558.  Specification of Letters Patent.  Patented June 3, 1919.

Application filed June 12, 1918. Serial No. 239,606.

*To all whom it may concern:*

Be it known that I, CHARLES J. McCORD, a citizen of the United States, residing at Merrill, in the county of Lincoln and State of Wisconsin, have invented new and useful Improvements in Spring-Wheels, of which the following is a specification.

This invention relates to improvements in spring wheels and especially with reference to the provision of spokes of improved construction and for use in automobile and other wheels and embodying also series of springs which are brought successively into action and which serve to effectually cushion the wheel and absorb shocks and obviate the employment of pneumatic tires.

A test will prove conclusively that my spring spoke wheel will readily absorb a much lighter shock than a pneumatic tire, thus affording great protection to the mechanical parts of the vehicle.

With the above and other objects in view, the invention consists in the construction, combination and arrangement of devices hereinafter described and claimed.

In the accompanying drawings:—

Figure 1 is an elevation with parts removed of a spring wheel constructed and arranged in accordance with my invention.

Fig. 2 is a transverse sectional view of the same, on the plane indicated by the line 2—2 of Fig. 1.

Fig. 3 is an elevation, partly in section, of one of the spokes, and on a larger scale.

Figs. 4 and 5 are detail views.

The wheel hub is indicated at 1 and provided with circular flange plates 2 which are spaced apart and between which are secured the inner ends of inner spoke members 3 the said spoke members being secured by rivets or bolts 4. Each inner spoke member 3 has a widened inner portion 5 and has a narrowed outer portion 6 the sides of which are parallel.

The rim 7 of the wheel is preferably made of steel and has a channel 8 on its inner side. Each spoke embodies, in addition to the inner member 3, an outer spring member 9 which is a single leaf twin spring as here shown comprising an oval outer portion 10 and arms 11. The arms bear against opposite sides of the inner spoke member 3 and extend from end to end of said inner spoke member and are secured thereto by a sleeve 12 which is fitted on the narrowed portion 6 and is secured by rivets 13, the said rivets also passing through the spring arms 11. The sleeve has a widened outer end 14 which presents oppositely curved and outwardly diverging surfaces 15 which conform to the shape of the curved portions 16 of the arms of said twin spring 9. The outer end of the spoke member 3 forms a stop 17.

A bumper 18 is arranged in the sleeve for movement toward and from the stop 17. The said stop is covered by a cushioning cap 19 which may be made of rubber or of any other suitable material.

An oval auxiliary spring 20 is arranged in the outer portion of the spring 9 and is held in contact therewith at the outer end by a clamp 21, the said clamp being, in practice, preferably a rivet as here shown and which has its ends fastened in openings in the walls 22 of the channel of the rim 7. The inner ends of the arms of the spring 20 bear against the bumper 18.

The auxiliary springs 23, 24 are also provided, which are somewhat smaller than and are similar to the auxiliary spring 20, the spring 23 being arranged in the spring 20 and the spring 24 being arranged in the spring 23 and said springs being normally out of contact with one another. The plates 25 are interposed between the inner ends of the springs 20, 23 and plates 25ª are interposed between the ends of the springs 23, 24, a secondary bumper 27 having its inner end secured between the plates 26, the said springs 20, 23, 24 and said bumpers 18 and 27 being secured together at the inner ends of said springs by rivets 28 which pass through the said plates and bumper. The outer end of the bumper 27 is normally spaced from and out of contact with the opposing outer end of the spring 24.

Disks 29 which are preferably made of sheet or plate metal are secured to the walls 22 of the rim channel as at 30, the said disks extending nearly to the axle center of the hub, and the washers 31, which may be made of rubber or other material fit around the axle and are fastened to the disks.

The operation of my improved spring wheel is as follows: The spring spokes because of their construction and arrangement receive and absorb all strains in a proportionate manner; that is the strain of shock is proportionately equal among the total number of springs. Initially, the prime acting spring 10 of each spoke is pressed until the bumper 18 is forced upwardly and strikes the stop 17. This brings spring 20 into action, thereby relieving spring 10 to a certain proportionate extent. When the spring 20 is pressed to a certain limit spring 23 contacts with it and is thus brought into action. In this event the lower part of spring 23 constitutes a bumper and the spring 20 constitutes a stop. When the spring 23 is pressed to a certain limit the spring 24 contacts with it and is thus brought into action. In this event the lower part of spring 24 constitutes a bumper and the spring 23 constitutes a stop. When the spring 24 is compressed to a certain limit the bumper 27 strikes its outer part, which constitutes a stop for it, and thus all further compression of the springs is stopped. Such successive action of the springs causes the wheel to successively and progressively take up and absorb shocks, so that the vehicle is caused to ride smoothly and evenly and I am enabled to entirely dispense with the use of pneumatic tires on the wheels. The lightest, as well as the heaviest, shocks are absorbed by the spokes and too great a strain is prevented from being imposed on any one of the springs.

My improved spring wheel makes it unnecessary to use any other springs on the vehicle. While my improved spring wheel enables the use of the pneumatic tire to be dispensed with still such tire can be used on the wheel if desired and in that event the spring wheel greatly prolongs the life of the pneumatic tire and greatly reduces the chance of blow-outs. Ordinarily the weight of the body of the vehicle puts the spring 9 into action, thus insuring the absorption of the slightest shocks. An ordinary load puts the spring 9 still further into action and also may bring the spring 20 into play. Any strain, shock, jolt, or jar that may come is readily and gradually absorbed by one or more of the springs of the combination.

While I have herein shown and described a preferred embodiment of my invention, I would have it understood that changes may be made in the form, construction and proportion of the several parts, without departing from the spirit of my invention and within the scope of the appended claims.

Having thus described my invention, I claim:—

1. In a wheel, a hub, a spoke, a rim, a spring connecting the spoke and rim, a secondary spring also connected to the rim and movable radially with respect to the spoke, a bumper to limit the movement of the secondary spring toward the spoke, a series of progressively acting springs connected to the secondary spring and a secondary bumper also connected to said secondary spring and said series of progressively acting springs and arranged to engage the innermost of said series of progressively acting springs so that strain or shock is transmitted gradually and gently from one spring to another throughout the series of springs.

2. A spoke for a spring wheel comprising an inner member for attachment to a hub, a spring rigidly secured to said inner member and extending therefrom to the wheel rim and secured to said rim, a second spring also attached to the rim and provided at its inner end with a bumper, said bumper being movable toward and from the outer end of the hub member, and a series of successively acting springs also connected to the last named spring and movable therewith toward and from the outer end of the spoke member.

3. A spoke for a spring wheel comprising an inner member for attachment to a hub, a spring rigidly secured to said inner member and extending therefrom to the wheel rim and secured to said rim, a second spring also attached to the rim and provided at its inner end with a bumper, said bumper being movable toward and from the outer end of the hub member, and a series of successively acting springs also connected to the last named spring and movable therewith toward and from the outer end of the spoke member, and a secondary bumper within the innermost spring.

4. A spoke for a spring wheel comprising an inner member for attachment to a hub, a doubled spring attached to said hub member and extending to the wheel rim, a sleeve on said spoke member and around the intermediate portions of said spring, a secondary spring attached to the first named spring and arranged with its inner end in said sleeve, a bumper at the inner end of said secondary spring, a series of successively acting springs arranged within the secondary spring and normally out of contact therewith and also out of contact with each other, said series of springs being also attached to said bumper and movable with the secondary spring in the sleeve and toward and from the outer end of the spoke member.

5. A spoke for a spring wheel comprising an inner member for attachment to a hub, a doubled spring attached to said hub member and extending to the wheel rim, a sleeve on said spoke member and around the intermediate portions of said spring, a secondary spring attached to the first named spring and arranged with its inner end in said sleeve, a bumper at the inner end of said secondary spring, a series of successively acting springs arranged within the secondary spring and normally out of contact therewith and also out of contact with each other, said series of springs being also attached to said bumper and movable with the secondary spring in the sleeve and toward and from the outer end of the spoke member, and a secondary bumper attached to the inner ends of said series of springs and arranged to finally engage the innermost spring.

In testimony whereof I affix my signature.

CHARLES J. McCORD.

Copies of this patent may be obtained for five cents each, by addressing the "Commissioner of Patents, Washington, D. C."